US012568446B2

(12) United States Patent
Li et al.

(10) Patent No.: US 12,568,446 B2
(45) Date of Patent: Mar. 3, 2026

(54) TRANSMITTER POWER-MANAGEMENT MECHANISM AND RELATED METHODS OF OPERATION

(71) Applicant: Nokia Technologies Oy, Espoo (FI)

(72) Inventors: Rui Li, San Diego, CA (US); Wei Zhuo, San Diego, CA (US); Bo Wang, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 517 days.

(21) Appl. No.: 18/062,864

(22) Filed: Dec. 7, 2022

(65) Prior Publication Data

US 2023/0101116 A1     Mar. 30, 2023

Related U.S. Application Data

(63) Continuation of application No. PCT/US2021/016183, filed on Feb. 2, 2021.

(60) Provisional application No. 63/047,766, filed on Jul. 2, 2020.

(51) Int. Cl.
| | |
|---|---|
| *H04W 52/34* | (2009.01) |
| *H04W 52/02* | (2009.01) |
| *H04W 52/24* | (2009.01) |
| *H04W 52/52* | (2009.01) |

(52) U.S. Cl.
CPC ..... *H04W 52/346* (2013.01); *H04W 52/0235* (2013.01); *H04W 52/241* (2013.01); *H04W 52/52* (2013.01)

(58) Field of Classification Search
CPC ........... H04W 52/346; H04W 52/0235; H04W 52/241; H04W 52/52; H04W 52/146; H04W 52/243; H04W 52/262; H04W 52/267; Y02D 30/70
See application file for complete search history.

(56) References Cited

U.S. PATENT DOCUMENTS

| | | | |
|---|---|---|---|
| 8,594,506 B1 | 11/2013 | Farmer et al. | |
| 8,649,449 B2* | 2/2014 | Nakajima .............. | H04L 1/0001 |
| | | | 375/267 |
| 2004/0002306 A1 | 1/2004 | Haapoja et al. | |
| 2010/0040120 A1* | 2/2010 | Sharma .............. | H04W 52/0229 |
| | | | 324/123 R |
| 2014/0086164 A1 | 3/2014 | Kim et al. | |
| 2015/0005023 A1* | 1/2015 | Wang ..................... | H04W 48/16 |
| | | | 455/509 |
| 2016/0088550 A1 | 3/2016 | Rabii | |
| 2016/0112146 A1 | 4/2016 | Lau et al. | |

(Continued)

OTHER PUBLICATIONS

International Search Report Mailed May 4, 2021 In Application No. PCT/US2021/072452.

(Continued)

*Primary Examiner* — Fayyaz Alam
(74) *Attorney, Agent, or Firm* — McCarter & English LLP

(57) ABSTRACT

Circuits and methods for operating a transmitter in a communication system is disclosed. The transmitter analyzes a power level along with one or more real-time transmission conditions associated with transmission of a signal. Based on the power level and the one or more real-time transmission conditions, the communication system selects between a low-power circuit and a high-power circuit for processing the signal for transmission.

20 Claims, 5 Drawing Sheets

(56)                    References Cited

U.S. PATENT DOCUMENTS

| | | | |
|---|---|---|---|
| 2016/0157173 A1* | 6/2016 | Shen ................... | H04W 52/146 |
| | | | 370/311 |
| 2017/0195964 A1 | 7/2017 | Smaini | |
| 2017/0346514 A1 | 11/2017 | Dimpflmaier et al. | |
| 2018/0234162 A1* | 8/2018 | Kim ..................... | H04B 17/318 |
| 2019/0036563 A1* | 1/2019 | Koshy ................... | H04W 52/18 |
| 2020/0137684 A1 | 4/2020 | Mattela | |
| 2021/0377881 A1* | 12/2021 | Cho .......................... | H03F 1/56 |

OTHER PUBLICATIONS

Written Opinion Mailed May 4, 2021 In Application No. PCT/US2021/072452.
International Search Report Mailed May 4, 2021 In Application No. PCT/US2021/016183.
Written Opinion Mailed May 4, 2021 In Application No. PCT/US2021/016183.
Extended European Search Report dated Oct. 27, 2023 of European Application No. 21717296.4, 9 pages.
First Office Action issued to Chinese Application No. 202180047626.6 dated Apr. 19, 2025 with English translation (26p).
European Examination Report dated Jan. 16, 2026 of European Application No. 21717296.4, 6 pages.

\* cited by examiner

TRANSMITTER POWER-MANAGEMENT MECHANISM AND RELATED METHODS OF OPERATION

CROSS-REFERENCE TO RELATED APPLICATION(S)

This application is a continuation of PCT application No. PCT/US2021/016183, filed Feb. 2, 2021, which claims the benefit of U.S. Provisional Patent Application Ser. No. 63/047,766, filed Jul. 2, 2020, which is incorporated by reference herein in its entirety.

TECHNICAL FIELD

This application relates to the communications field, and more specifically, to a wireless communications method and device.

BACKGROUND

Rapid growth in computing technology is creating a greater demand for data communication. The increasing demand in turn drives further growth in communication technology, which often requires additional features, increased processing capacities, and/or increased resources within a given space. Such growth often introduces new challenges. For example, the increase in the processing speed and/or the amount of data communicated between devices (e.g., to/from a User Equipment (UE)) increases power consumption associated with the internal data processing, such as to accommodate faster transitions in data signals.

BRIEF DESCRIPTION OF THE DRAWINGS

To describe the technical solutions in the implementations of the present technology more clearly, the following briefly describes the accompanying drawings. The accompanying drawings show merely some aspects or implementations of the present technology, and a person of ordinary skill in the art may still derive other drawings from these accompanying drawings without creative efforts.

DETAILED DESCRIPTION

Figure 1:
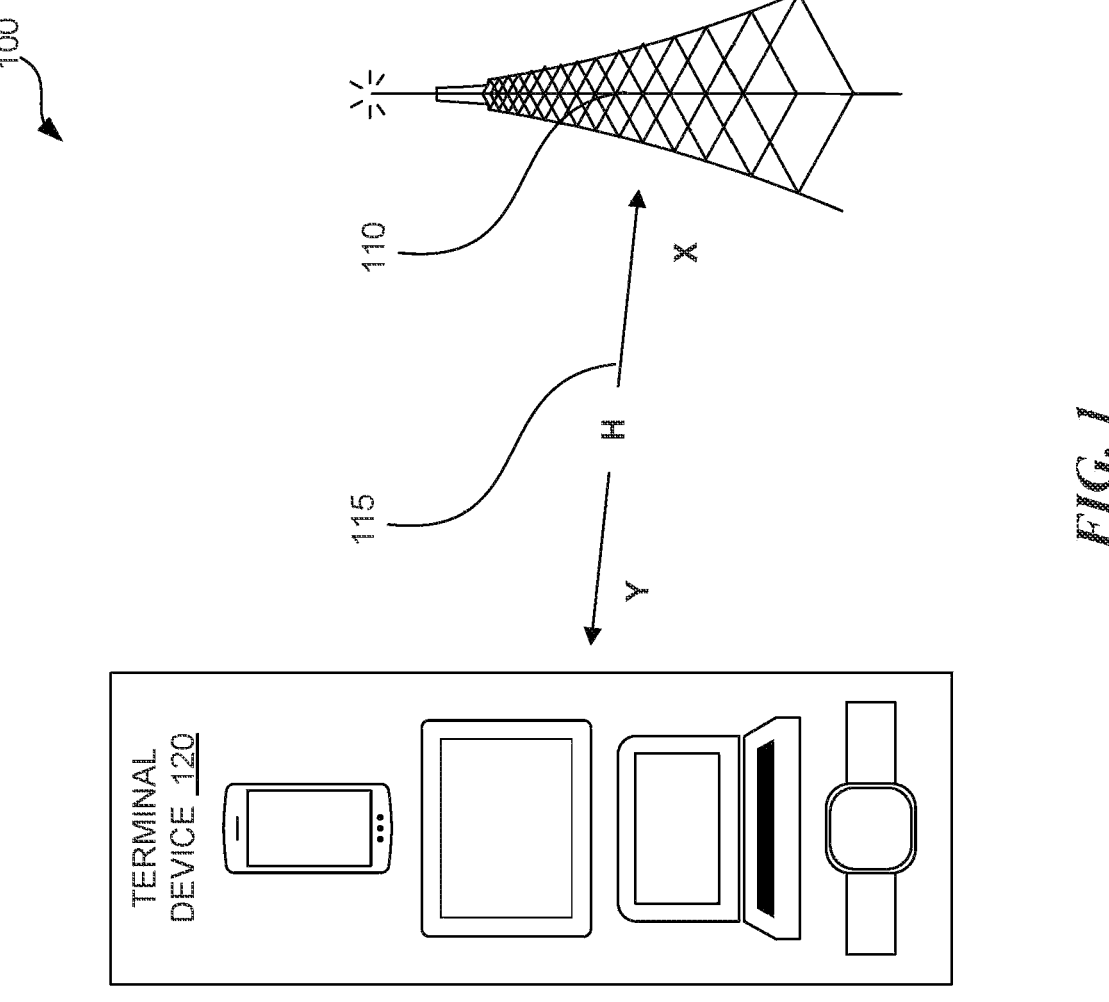
FIG. 1 is an illustration of a wireless communication system in accordance with one or more implementations of the present technology.

The following describes the technical solutions in the one or more implementations of the present technology. A communications system includes circuits and/or software to utilizes real-time signal quality and channel conditions to determine optimal power consumption modes.

Modern communication devices (e.g., cellular phones) operate across a large range of use cases and modulation schemes. Fifth Generation (5G) protocol drives ever-increasing data rates at the cost of higher power consumption due to stringent demands on RF transmitter performance. For example, some conventional transceivers switch between high-power and low-power modes based on worst-case peak power, such as based on output power or waveform peak-to-average power ratio (PAPR). Such limitations on the power is often related to inherent difficulties associated with designing linear amplifiers that operate efficiently with large power back-off.

One or more implementations of the present technology uses new and/or additional aspects of the communication environment to control the amount of power and/or performance level associated with transmission processing. As described in detail below, the transmitter can select a low-power transmitter circuit that consume a lower amount of power than a high-power circuit according to the real-time communication conditions. For example, one or more implementations of the present technology can use modulation order instead of and/or in addition to PAPR to optimize the operating power levels of a transmitter. Additionally or alternatively, the transmitter can optimize according to specific band and/or channel bandwidth based on targeted bandwidths (e.g., bandwidths having relaxed emission requirements for limiting/controlling the transmitted signal from interfering with other bands and/or for limiting/controlling power levels in the transmitted signals). Thus, as modulation order increases, the transmitter can dynamically adjust power consumption instead of operating according to a fixed worst-case scenario/waveform. The additional parameters provide increased frequency-based granularity in selecting the low-power operation that leads to reduction in overall power consumption. The reduced power consumption further provides longer battery life for the transmitting device. For example, battery life is not penalized when the transmitter needs to transmit legacy low-order modulation. Maximum power and highest performance mode will be reserved only for the cases when the network requires it.

Further, power consumption can be controlled across different frequency bands such that power consumption is not penalized for all bands in order to accommodate specific bands with stringent coexistence requirements. As an illustrative example, LTE band B1 and NR band n1 require the UE to meet an emission limit of −50 dBm/1 MHz at the transmit antenna in the B34 frequency range of 2010-2025 MHz. Also, LTE band B13 requires the UE to meet emission limit of −57 dBm/6.25 KHz when the network signals "NS_07" in the frequency range 769-775 MHz. The UE does not have such stringent emission requirements when transmitting the signals in other bands (e.g., outside of B1 and B13). As such, the UE can control power consumption/usage according to the transmission bands and reduce power consumption for less-stringent transmission bands.

In the following description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present technology. References in this description to "an implementation," "one implementation," or the like mean that a particular feature, structure, material, or characteristic being described is included in at least one implementation of the described technology. Thus, the appearances of such phrases in this specification do not necessarily all refer to the same implementation. On the other hand, such references are not necessarily mutually exclusive either. Furthermore, the particular features, structures, materials, or characteristics can be combined in any suitable manner in one or more implementations. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth in the following description for purposes of clarity. Moreover, although the following description sets forth several implementations of different aspects of the present technology, several other implementations can have different configurations or different components than those described in this section. Accordingly, the disclosed techniques can have other implementations with additional elements or without several of the elements described below.

Many implementations or aspects of the technology described below can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular implementations, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both. The term "and/or" in this specification is only an association relationship for describing the associated objects, and indicates that three relationships may exist, for example, A and/or B may indicate the following three cases: A exists separately, both A and B exist, and B exists separately. In addition, the character "/" in this specification generally indicates an "or" relationship between the associated objects.

Suitable Environments

FIG. 1 is an illustration of a wireless communication system in accordance with one or more implementations of the present technology. As shown in FIG. 1, the wireless communications system 100 can include a network device 110. The network device 110 can include circuitry configured to provide communication coverage for a specific geographic area. Some examples of the network device 110 can include: a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP). Additional examples of the network device 110 can include a relay station, an access point, an in-vehicle device, a wearable device, and the like. The network device 110 can include other wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. Optionally, a 5G system or network may be further referred to as a new radio (New Radio, NR) system or network.

Additionally or alternatively, the wireless communications system 100 can include a terminal device 120. The terminal device 120 can be an end-user device configured to facilitate wireless communication. The terminal device 120 can be configured to wirelessly connect to the network device 110 (via, e.g., a wireless channel 115) according to one or more corresponding communication protocols/standards. The terminal device 120 may be mobile or fixed. The terminal device 120 can be an access terminal, a UE, a user unit, a user station, a mobile site, a mobile station, a remote station, a remote terminal, a mobile device, a user terminal, a terminal, a wireless communications device, a user agent, or a user apparatus. Some examples of the terminal device 120 can include: a cellular phone, a smart phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an IoT device, a terminal device in a future 5G network, a terminal device in a future evolved PLMN, or the like.

For illustrative purposes, FIG. 1 illustrates the wireless communications system 100 via the network device 110 and the terminal device 120. However, it is understood that the wireless communications system 100 can include additional/other devices, such as additional instances of the network device 110 and/or the terminal device 120, a network controller, a mobility management entity, etc.

Wireless Communication Architecture

Figure 2:
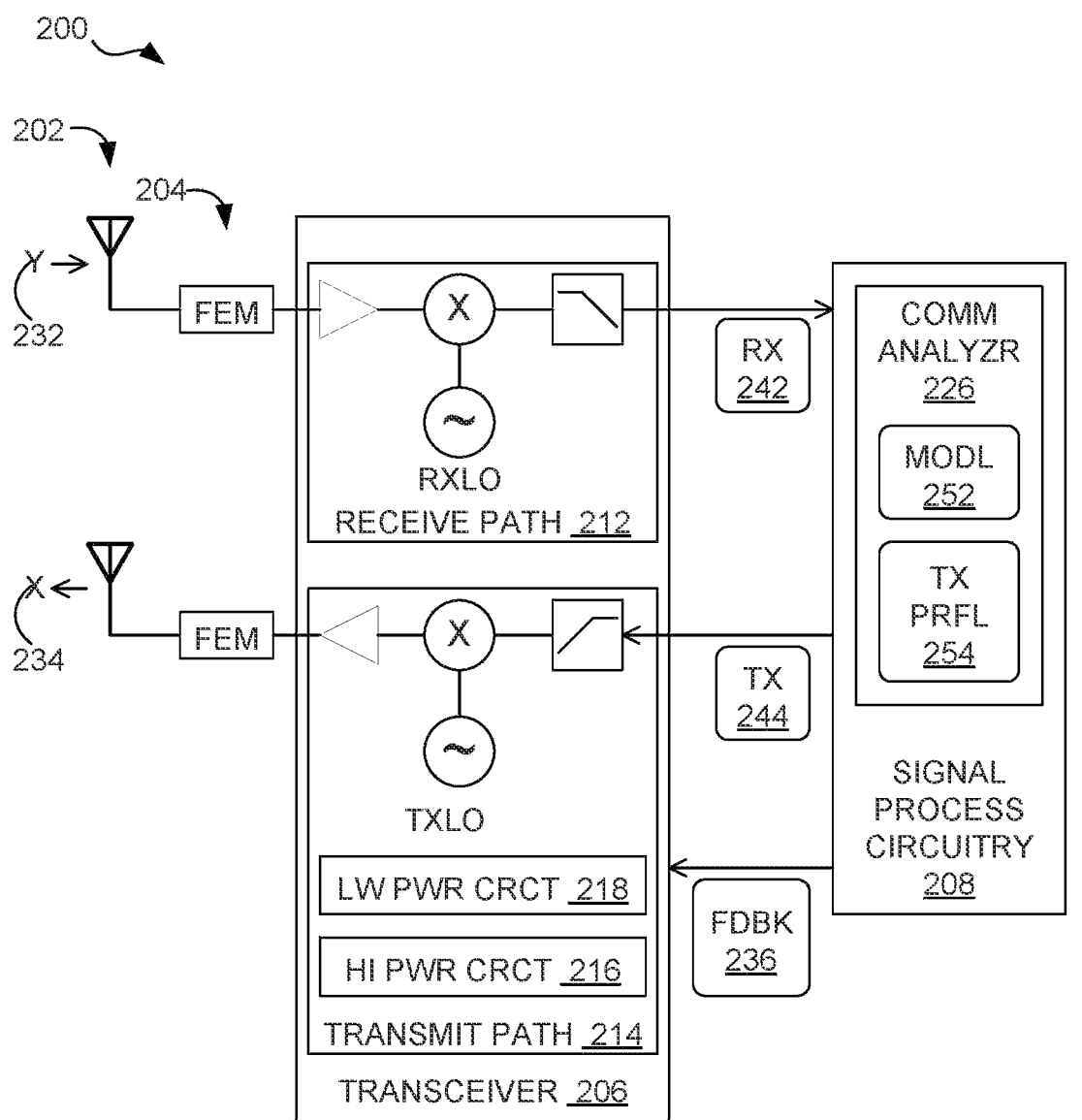
FIG. 2 is a block diagram of a mobile communication device in accordance with one or more implementations of the present technology.

FIG. 2 is a block diagram of a mobile communication device 200 (e.g., the terminal device 120 of FIG. 1, the network device 110 of FIG. 1, and/or a portion therein) in accordance with one or more implementations of the present technology. The mobile communication device 200 can include circuitry configured to communicate wireless signals with another device. For example, the terminal device 120 (e.g., a UE) can include the mobile communication device 200 configured to exchange wireless signals with the network device 110 and/or other wirelessly coupled devices. In some implementations, the mobile communication device 200 can be configured to communicate according to Fourth Generation (4G) standard, 5G standard, 802.11 standard, and/or other New Radio standard. The mobile communication device 200 can further be backwards compatible and support one or more preceding or older communication standards/protocols (e.g., Third Generation (3G)).

The mobile communication device 200 can include an antenna group 202 that includes a set of transmission and/or receiver antennas. The antenna group 202 can be configured to utilize one or multiple antennas to exchange wireless signals with a corresponding device. In some implementations, the antenna group 202 can be coupled to a front-end module (FEM) 204 configured to condition the received/outgoing signals. For example, the FEM 204 can include a set of frequency-based filters, such as a set of band-pass filters configured to isolate a specific frequency range utilized or targeted by the technology, standard, and/or context associated with the communication session.

The mobile communication device 200 can include a transceiver 206 coupled to the antenna group 202. The transceiver 206 can be part of an RF Front-End (RFFE) chip and include circuitry configured to process various components of wireless signals. For example, the transceiver 206 can include a receive path 212 and a transmission path 214.

The receive path 212 can include circuitry configured to receive communication signals from another device. In some implementations, the receive path 212 can include an amplifier (e.g., a low-noise amplifier (LNA)), a down-converter, one or more filters (e.g., a low-pass filter), a sampling circuit (e.g., an analog-to-digital (A/D) converter), or a combination thereof. For example, the receive path 212 can use the amplifier to control the power in a received signal 232 (e.g., an output from one or more receive antennas). The down-converter (represented by a mixer/multiplier and a receive local oscillator (RXLO) in FIG. 2) can convert the wireless signal from a carrier frequency to a baseband signal. The converted signal can be filtered (via, e.g., a low-pass filter to remove high-frequency noise) and sampled to generate a digital stream of received baseband data 242. The received baseband data 242 can be provided to a signal processing circuitry 208, which may be configured to recover the content according to one or more predetermined processes (e.g., detection, decoding, interleaving, etc.).

The transmission path 214 can include circuitry configured to send communication signals to another device. In some implementations, the transmission path 214 can include a signal generator (e.g., a digital-to-analog (D/A) converter), one or more filters (e.g., high-pass and/or band-pass filters), an up-converter, an amplifier, or a combination thereof. For example, the transmission path can receive a digital stream of transmission baseband data 244 that includes a message content as processed by the signal processing circuitry 208 (via, e.g., encoding, interleaving, modulating, etc.). The digital data (e.g., the transmission baseband data 244) may be converted to an analog signal via the D/A converter and/or the may be filtered signal (e.g., before and/or after analog conversion) to remove various noise components (e.g., DC power). The up-converter (represented by a mixer/multiplier and a transmission local oscillator (TXLO) in FIG. 2) can transform/modulate the signal from baseband to a carrier frequency. The up-converted signal can be amplified to power levels appropriate for transmission. The resulting signal can be transmitted as transmission signal 234 through the transmission antenna.

The transceiver 206 can include two or more circuitries configured to provide similar functions, such as for processing received signals or transmission signals, at different power levels. For example, the transceiver 206 can include a high-power circuit 216 and a low-power circuit 218 both configured to process the transmission signal 234 at the different corresponding power levels. The low-power circuit 218 can include components/designs that perform the same function as the high-power circuit 216 but using less power.

In some implementations, the high-power circuit 216 can include a D/A converter, an analog baseband filter (BBF), a harmonic reject mixer (HRM), a local oscillator (LO), and/or a highly linear driver amplifier (DA). The LO for the high-power circuit 216 can include a high-performance voltage-controlled oscillator (VCO) with low phase noise capabilities. Further, the highly linear DA can be configured with sufficient capacity to provide linear operation for processing high-powered or high peak-to-peak signals (e.g., without saturating the amplifier). In comparison, the low-power circuit 218 can include one or more components with lower performance and power rating and/or omit one or more components. For example, a first low-power path can be configured to take advantage of band-specific requirements (e.g., relaxed emission requirements). Accordingly, the first low-power path can include a BBF with optional stages bypassed, a normal mixer to bypass the HRM, an LO with a lower supply voltage and low-power VCO, and/or a DA optimized for lower transmission power in comparison to the high-power circuit 216. Also, for example, a second low-power path can be configured to conserve power when maximum signal-to-noise ratio (SNR) is not required, such as for lower-order modulations. The second low-power path can include an LO with lower power supply voltage and low-power VCO and/or a DA optimized for lower transmission power in comparison to the high-power circuit 216.

The trade-off in power may negatively affect the resulting accuracy or signal reliability. As described in detail below, the mobile communication device 200 can be configured to dynamically select and use the different powered circuits according to real-time environmental/signal factors. For example, the mobile communication device 200 can utilize the low-power circuit 218 for communication scenarios or condition, such as lower interference environments and/or lower throughput requirements, that may be less affected by any reduction in accuracy/reliability. Accordingly, the mobile communication device 200 can take advantage of the power reduction without increasing the error rates, retransmission, etc.

The signal processing circuitry 208 (e.g., a baseband modem/chip) can be configured to process/analyze the received baseband data 242 with respect to the communicated/intended content. The signal processing circuitry 208 can be configured to assess the wireless channel 115 of FIG. 1 and/or other real-time communication conditions. For example, the signal processing circuitry 208 can determine a channel estimate (e.g., a description of the changes or effects provided by the wireless channel 115 on the transmitted signal) and/or communication control parameters, such as a modulation profile 252, a transmission profile 254, etc.

In some implementations, the signal processing circuitry 208 can analyze communications (e.g., control plane messages) exchanged with a network controller (e.g., the network device 110, such as a base station or another controller) to determine the communication control parameters. The mobile communication device 200 can include a communication analyzer 226 (e.g., circuitry, software and/or firmware module, or a combination thereof) configured to analyze the real-time communication conditions associated with the transmission signal 234. For example, the communication analyzer 226 can analyze portions within the exchanged signals, such as the reference portion, control plane parameters, etc. The network controller can assign and send one or more the communication control parameters, and/or the transmitting device can select and report one or more of the communication control parameters.

The communication control parameters can be derived according to real-time conditions and/or scenarios, and control one or more aspects of the exchanged messages/ signals to meet the real-time demands according to the conditions/scenarios. For example, the modulation profile 252 can control a modulation scheme or constellation (e.g., 64 Quadrature Amplitude Modulation (QAM) or Binary Phase Shift Keying (BPSK)) used to encode the symbols in the exchanged signals (e.g., the transmission signal 234). Accordingly, the modulation profile 252 can correspond to a number/quantity of bits for each symbol and the associated data rate. Also, the transmission profile 254 can control a frequency band and/or a power setting used to send the transmission signal 234. The transmission profile 254 may designate higher power settings when initially exchanged signals have weaker strengths/power (such as when the devices are further apart). Additionally or alternatively, the transmission profile 254 may designate certain bandwidths configured to accommodate other simultaneously communicated signals/sessions (according to, e.g., coexistence and/ or emission requirements).

The mobile communication device 200 can select the appropriate power-level for processing the transmission signal 234 based on the analyzed information (e.g., the modulation order and/or the transmission frequency band). For example, when a current modulation scheme matches one of the predetermined schemes, the mobile communication device 200 can use the low-power circuit 218 to process the transmission signal 234. Additionally or alternatively, the mobile communication device 200 can select the low-power circuit 218 when the targeted data rate for the communication is lower than a predetermined rate threshold. Also, for example, the mobile communication device 200 can select the low-power circuit 218 when the transmission band matches one of the predetermined bands associated with lower emission requirements and/or when the transmission power is below a predetermined power threshold. As an illustrative example, the mobile communication device 200 can select the low-power circuit 218 when the transmission band does not match B1 and B13 for 5G communication protocol (e.g., transmission bands having stringent out-of-band emission requirements to prevent interference with other nearby protected bands).

In some implementations, the communication analyzer 226 can determine the modulation profile 252 and/or the transmission profile 254 and compare them to corresponding thresholds or conditions. Accordingly, the communication analyzer can generate a feedback signal 236 that corresponds to the circuit selection. The transceiver 206 can receive the feedback signal 236 and select the transmission circuits accordingly. In other implementations, the communication analyzer 226 can determine the modulation profile 252 and/or the transmission profile 254 and communicate them to the transceiver 206 using the feedback signal 236. In other words, the feedback signal 236 can include the modulation profile 252 and/or the transmission profile 254 for the current or ongoing communication session. The transceiver 206 can receive the information and compare them to corresponding thresholds or conditions. Resulting from the comparisons, the transceiver 206 can generate one or more internal selection signals for selecting the transmission signal path. As an illustrative example, the signal processing circuitry 208 (e.g., the baseband chip) can maintain the knowledge of the desired transmission output power and modulation order. The maintained metrics may be passed to the transceiver 206 through gain control commands in the feedback signal 236.

Example Transmission Circuits

Figure 3A:
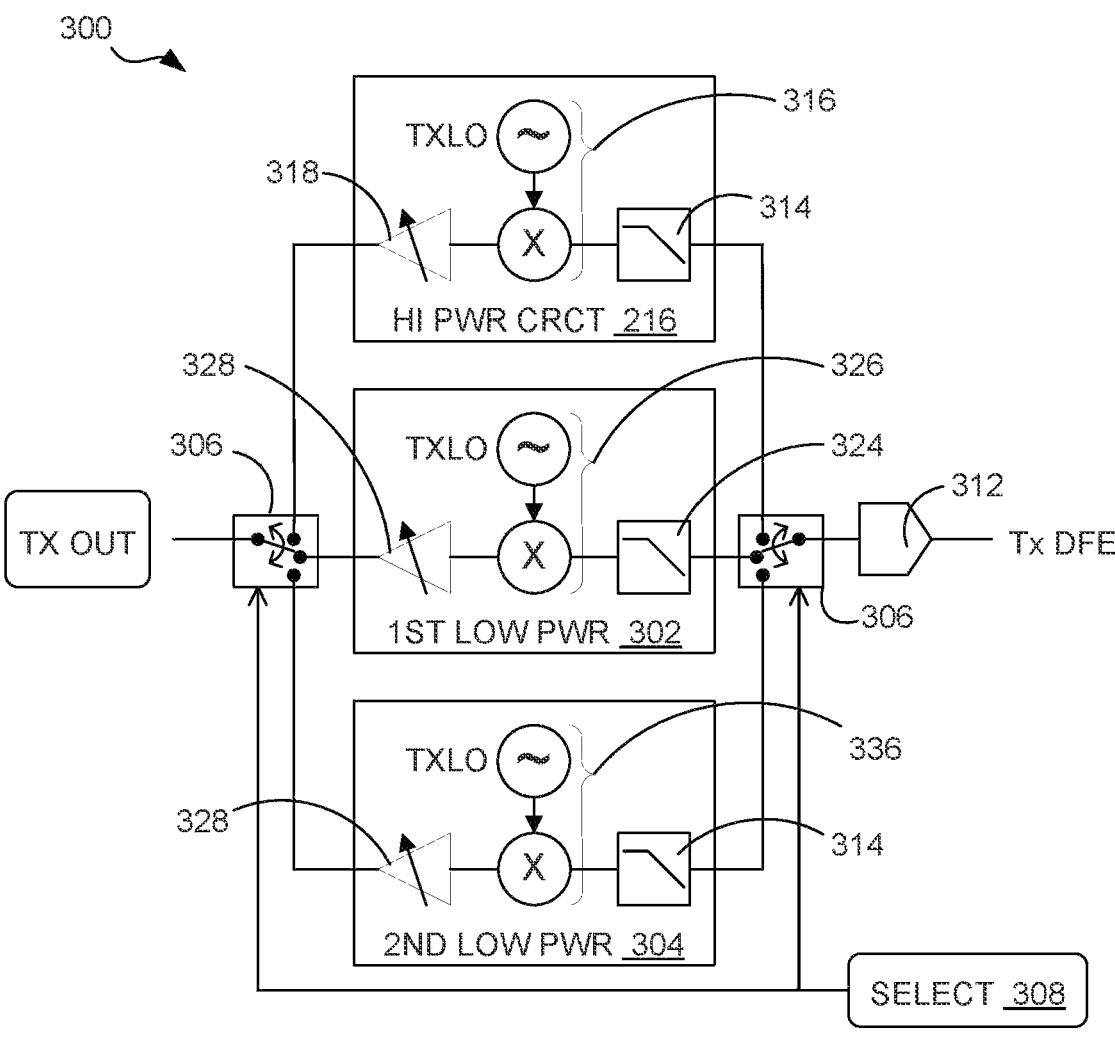
FIGS. 3A-3B are block diagrams of example transmission circuits in accordance with one or more implementations of the present technology.
Figure 3B:
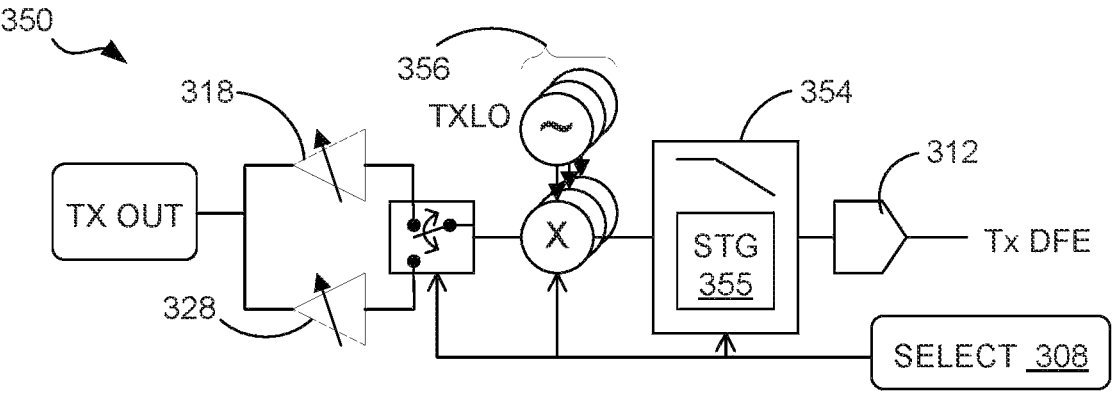

FIGS. 3A-3B are block diagrams of example transmission circuits in accordance with one or more implementations of the present technology. FIG. 3A illustrates an example transmission circuit 300 (e.g., an instance of the transmission path 214 of FIG. 2). The transmission circuit 300 can include the high-power circuit 216 and one or more instances of the low-power circuit 218 of FIG. 2, such as a first low-power transmitter 302 and a second low-power transmitter 304. The first low-power transmitter 302 and the second low-power transmitter 304 can include different circuits to provide different performance capacities and corresponding power requirements.

The transmission circuit 300 can include a D/A converter 312 configured to change the digital transmission baseband data 244 of FIG. 2 into an analog signal for transmission. The transmission circuit 300 can further include a selection circuit 306 controlled by a selection signal 308 to select one of the transmitter circuits (e.g., from amongst the high-power circuit 216, the first low-power transmitter 302, and the second low-power transmitter 304). As described in detail below, the mobile communication device 200 can generate the selection signal 308 based on one or more real-time aspects of the communication environment/condition, such as the modulation profile 252 of FIG. 2 and/or the transmission profile 254 of FIG. 2.

In some implementations, the high-power circuit 216 can include a BBF 314, a high-performance mixer 316, and/or a high-power DA 318 configured to process the analog signal for transmission. The BBF 314 can be configured to filter the baseband analog signal to remove noise and/or other unwanted signal components. The high-performance mixer 316 can include a mixer (e.g., an HRM) configured to remove harmonic interferences in the analog signal (e.g., after the BBF 314). For example, the high-performance mixer 316 can include multiple mixers each driven by a corresponding LO. A subset of the mixer-LO combination can be configured as the HRM. The high-power DA 318 can be configured or tuned to process/amplify higher power signals.

The low-power circuit(s) can include different circuitry than the high-power circuit 216 and be configured to provide lower processing capacity and consume reduced power. For example, the first low-power transmitter 302 can include circuitry configured to reduce power consumption when the transmission band has relaxed emission requirements, such as regarding harmonic components and/or other unintended components (e.g., non-content-related noise) in the transmitted signals that may serve as interferences for other frequency bands. In some implementations, the first low-power transmitter 302 can include a low-performance filter 324, a low-performance mixer 326, and/or a low-power DA 328 configured to process the analog signal for transmission. The low-performance filter 324 can have one or more components (e.g., one or more op-amps) removed or disabled in comparison to high-power circuit 216. The low-performance mixer 326 can include one or more mixers, each with a corresponding LO, without the HRM. In some implementations, the low-performance mixer 326 can include LO components with lower supply voltages and/or low-power voltage-controlled oscillator (VCO) in comparison to the high-performance mixer 316. The low-power DA 328 can be configured to process/amplify (e.g., optimized for) lower power signals than the high-power DA 318.

Also, for example, the second low-power transmitter 304 can include circuitry configured to reduce power consumption when maximum performance (e.g., maximum SNR) is not required, such as for transmitting basic information and/or for transmitting at lower data rates or using corresponding modulation schemes. The second low-power transmitter 304 can include the BBF 314 and the low-power DA 328 along with a low-power mixer 336. The low-power mixer 336 can include one or more LO components with lower supply voltages and/or low-power VCO in comparison to the high-performance mixer 316. In some implementations, the low-power mixer 336 may include the HRM unlike the low-performance mixer 326.

FIG. 3B illustrates an example transmission circuit 350 (e.g., an instance of the transmission path 214 of FIG. 2). The transmission circuit 350 can be a different implementation of the transmission circuit 300 of FIG. 3A. For example, the transmission circuit 350 can include the D/A converter 312 coupled to a configurable BBF 354. The configurable BBF 354 can include one or more selectively-operable stages 355 (e.g., one or more op-amps) configured to operate according to the selection signal 308. When the selectively-operable stages 355 are activated, the configurable BBF 354 can operate similarly as the BBF 314 of FIG. 3A. Otherwise, when the selectively-operable stages 355 are deactivated, the configurable BBF 354 can operate similarly as the low-performance filter 324 of FIG. 3A.

Also, the transmission circuit 350 can include a selectable set of mixers 356 that each include an LO component. The mixer-LO pairs can be activated according to the selection signal 308. In some implementations, the selectable set of mixers 356 can include three or more mixer-LO pairs. One or more mixer-LO pairs can include the HRM similarly as the high-performance mixer 316 of FIG. 3A. One or more other mixer-LO pairs can include or use basic or non-HRM components (e.g., similar to the low-performance mixer 326), lower supply voltages, and/or low-power VCO in comparison to the high-performance mixer 316.

The selectable set of mixers 356 can be selectively coupled to the high-power DA 318 and the low-power DA 328 through the selection circuit 306. Accordingly, the mobile communication device 200 can use the selection signal 308 to configure the transmission circuit 350 to function as the high-power circuit 216 of FIG. 2 or one of the low power circuits (e.g., the first low-power transmitter 302 of FIG. 3A and/or the second low-power transmitter 304 of FIG. 3A).

Control Flow

Figure 4:
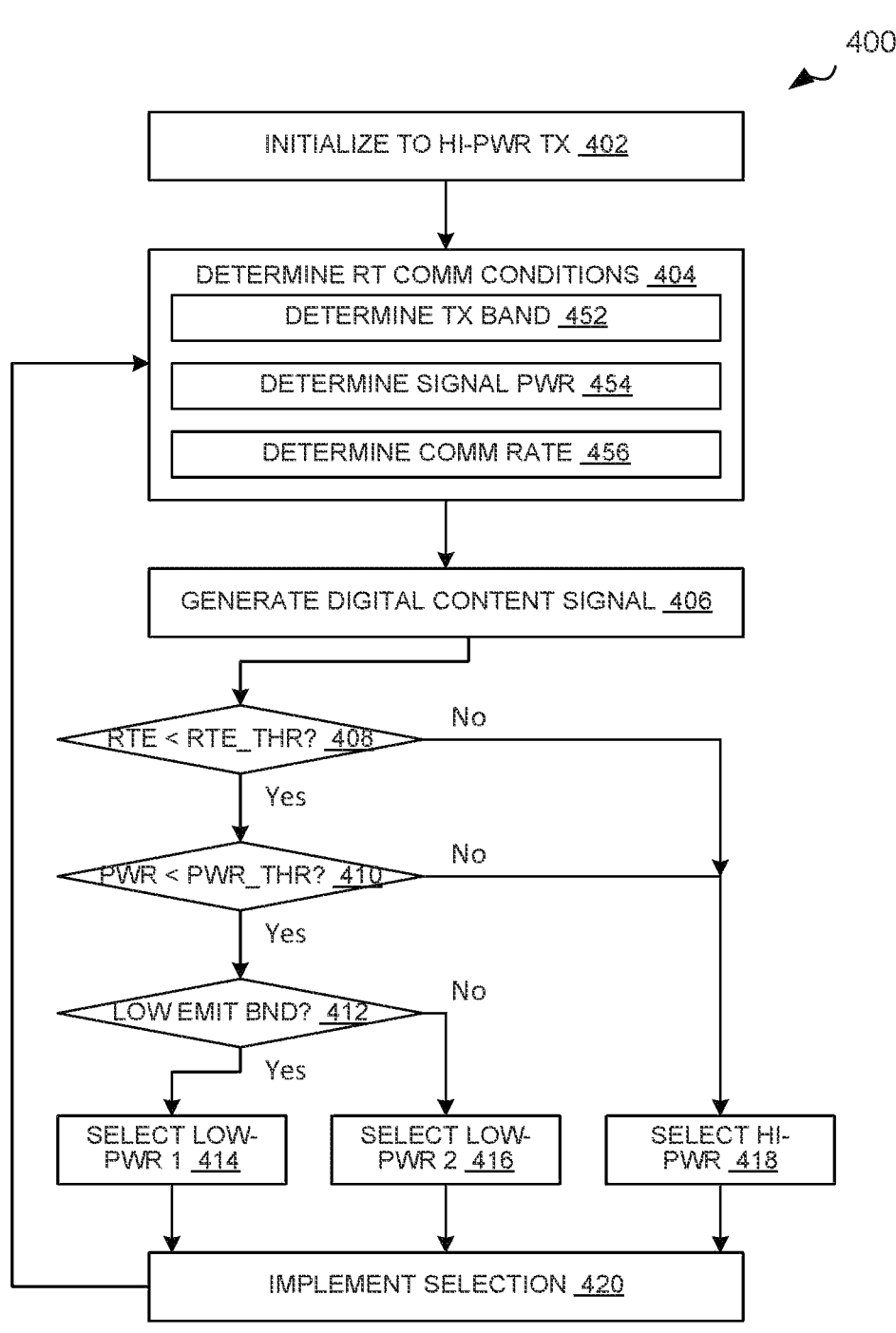
FIG. 4 is a flowchart of an example method in accordance with one or more implementations of the present technology.

FIG. 4 is a flowchart of an example method 400 in accordance with one or more implementations of the present technology. The method 400 can be for controlling the power consumption level associated with transmission signal processing. The method 400 can be for operating the network device 110 of FIG. 1, the terminal device 120 of FIG. 1, the mobile communication device 200 of FIG. 2, a portion thereof, or a combination thereof. The method 400 can correspond to generation of the selection signal 308 and operation of the transmission circuit 300 of FIG. 3A and/or the transmission circuit 350 of FIG. 3B. The method 400 can correspond to selecting amongst a higher-power circuits and two or more situation-specific low-power circuits.

At block 402, the mobile communication device 200 can initialize the transmission path 214 to utilize the high-power circuit 216 of FIG. 2 in processing the transmission signal 234. In other words, the mobile communication device 200 can initially use the high-power circuit 216 to process and generate the transmission signal 234, such as during a beginning portion of a communication session.

At block 404, the mobile communication device 200 can determine real-time communication conditions associated with the transmission signal 234. The mobile communication device 200 (via, e.g., the signal processing circuitry 208 of FIG. 2) can determine one or more parameters that represent the real-time communication environment and/or the current communication settings. For example, the mobile communication device 200 can determine the modulation profile 252 of FIG. 2 and the transmission profile 254 of FIG. 2 as described above.

At block 452, the mobile communication device 200 can determine a transmission band associated with the transmission signal 234. For example, the determined real-time transmission condition can include the transmission profile 254 with a transmission frequency band assigned to and/or used to transmit the transmission signal 234. The network device 110 can determine the transmission frequency band based on analyzing the communication channel conditions, such as according to channel estimates reported by the terminal device 120, and/or based on other terminal devices communicating with the network device 110. The terminal device 120 can determine the transmission frequency band based on analyzing a predetermined portion in a control signal (e.g., a control plane signal) from the network device 110.

At block 454, the mobile communication device 200 can determine the signal power associated with the transmission signal 234. For example, the determined real-time transmission condition can include the transmission profile 254 with a transmission signal strength assigned to and/or used to transmit the transmission signal 234. The determination process can be similar to the determination of the transmission band. For example, the network device 110 can determine the transmission signal strength based on signal strengths (e.g., power of reference portions or pilot tones at least representative of distance separating the communication endpoints) detected by the network device 110 and/or the terminal device 120. The network device 110 can assign and communicate the transmission signal strength to the terminal device 120 using a corresponding portion of the control signal.

At block 456, the mobile communication device 200 can determine the communication rate associated with the transmission signal 234. In some implementations, the mobile communication device 200 can determine the communication rate or the data rate according to the application and/or the type of data. Alternatively or additionally, the mobile communication device 200 can determine a modulation scheme used to encode the target data in generating the transmission signal 234. The modulation scheme can be determined according to the bit density (e.g., number bits per each symbol) associated with the modulation scheme. Alternatively or additionally, the network device 110 and the terminal device 120 can communicate the determined modulation scheme that is or will be used to generate and decode the transmission signal 234.

At block 406, the mobile communication device 200 can generate a digital content signal for transmission. For example, the signal processing circuitry 208 can generate the transmission baseband data 244 of FIG. 2 by encoding and/or rearranging the content data according to the communication protocol (e.g., 4G, 5G, 802.11, NR, and/or legacy cellular protocol) targeted for use in processing and sending the transmission signal 234.

At decision block 408, the mobile communication device 200 can compare the determined communication rate to a rate threshold. For example, the mobile communication device 200 can compare the modulation profile 252 to a predetermined set of modulations having data rates below a predetermined rate threshold. Alternatively or additionally, the mobile communication device 200 can compare the targeted data rate to the predetermined rate threshold. When the targeted data rate is not less than the threshold and/or when the modulation scheme does not match the predetermined set associated with the lower rates, the mobile communication device 200 can select the high-power circuit 216 as further described below at block 418. In some implementations, the mobile communication device 200 can use a targeted SNR for the wireless signal.

Otherwise (e.g., for lower targeted rates), the mobile communication device 200 can select one of the low-power circuit (e.g., the first low-power transmitter 302 of FIG. 3A or the second low-power transmitter 304) or select a corresponding configuration for the example transmission circuit 350 of FIG. 3B. For example, the mobile communication device 200 can analyze the appropriateness of selecting the low-power circuit 218 when the data rate is lower than the threshold, when the modulation scheme matches one of the predetermined modulations, and/or when the targeted SNR is lower than a corresponding threshold with respect to the rate.

At decision block 410, the mobile communication device 200 can compare the determined power to a power threshold. For example, the mobile communication device 200 can compare the power setting of the transmission profile 254 to a predetermined rate threshold. When the power setting for the transmission signal 234 is not less than the threshold, the mobile communication device 200 can select the high-power circuit 216 as further described below at block 418. Otherwise, when the power setting is less than the corresponding threshold and/or when the targeted rate is less than the corresponding threshold, the mobile communication device 200 can select the low-power circuit 218 (e.g., one of the first/second low-power transmitter 302/304 or a low-power configuration for the example transmission circuit 350).

At decision block 412, the mobile communication device 200 can compare the determined transmission band to a set of bands predetermined to be associated with low emission requirements. For example, when the transmission band has stringent out-of-band emission requirements (e.g., B1 and B13), the mobile communication device 200 can select the first low-power transmitter 302 or a corresponding configuration. Otherwise, when the transmission band is one predefined to be associated with less stringent out-of-band emission requirements (e.g., in comparison to bands adjacent to protected frequencies, such as B1 and B13), the mobile communication device 200 can select the second low-power transmitter 304 or a corresponding configuration.

At blocks 414-418, the mobile communication device 200 can generate the selection signal 308 for selecting the circuit according to the analysis of the signal power, rate, and/or other conditions/settings. At block 414, the mobile communication device 200 can generate the selection signal 308 for selecting a first low power circuit according to the analysis. At block 416, the mobile communication device 200 can generate the selection signal 308 for selecting a second low power circuit according to the analysis. At block 418, the mobile communication device 200 can generate the selection signal 308 for selecting a high power circuit according to the analysis.

At block 420, the mobile communication device 200 can implement the selection. For example, the mobile communication device 200 can control the selection circuit 306 of FIG. 3A and FIG. 3B and/or other selectable circuits according to the selection signal 308.

Selection and implementation of the high-power circuit 216 can correspond to implementing the baseband filter 314 of FIG. 3A, the high-performance mixer 316 of FIG. 3A, and/or the high-power DA 318 of FIG. 3A. In some implementations, the high-power circuit 216 can correspond to enabling the selectively-operable stages 355 of FIG. 3B of the configurable baseband filter 354 of FIG. 3B, all mixer-LO groupings and/or HRM-LO grouping in the selectable mixer 356 of FIG. 3B, and/or the high-power DA 318. Accordingly, the high-power circuit 216 can utilize or access sufficient power to meet the drive for higher order modulation to increase data throughput and to meet the correspondingly increased SNR requirement. The high-power circuit 216 can provide relatively lower emissions at maximum output power for the transmission signal 234. The high-power circuit 216 can be the default/initialized circuitry, such as at the beginning of the communication session, for processing the transmission signal 234.

Selection and implementation of the first low-power transmitter 302 can be for reducing the power consumption in generating the transmission signal 234 when the transmission band has relatively relaxed requirements and/or when the emission requirements are relaxed as described above. The first low-power transmitter 302 can correspond to implementing the low-performance filter 324 of FIG. 3A, the low-performance mixer 326 of FIG. 3A, and/or the low-power DA 328 of FIG. 3A having reduced features, capacities, accuracies, granularities, and/or corresponding power consumption levels in comparison to the high-power circuit 216. In some implementations, the first low-power transmitter 302 can correspond to disabling the selectively-operable stages 355 of the configurable baseband filter 354, disabling a subset of mixer-LO groupings and/or the HRM-LO grouping in the selectable mixer 356, and/or selecting the low-power DA 328 as illustrated in FIG. 3B. In some implementations, if the local-oscillator nth harmonic does not produce mixing products that fall within protected regions, the HRM can be disabled to save power. In other words, the power levels in the harmonic interferences may be low enough that they can be ignored in view of reducing the power consumption. Additionally, as the transmission power is reduced, the DA operating point can also be adjusted lower to improve efficiency and trade-off higher noise and nonlinearity.

Selection and implementation of the second low-power transmitter 304 can be for reducing the power consumption in generating the transmission signal 234 when the maximum SNR is not required. The second low-power transmitter 304 can correspond to implementing the low-power mixer 336 of FIG. 3A and/or the low-power DA 328 in comparison to the high-power circuit 216. In some implementations, the second low-power transmitter 304 can correspond to enabling/utilizing LO with lower supply voltage and/or low-power VCO in the selectable mixer 356 and/or selecting the low-power DA 328. Modulation order may be independent of transmission power. As such, the second low-power transmitter 304 can provide power savings when reduced/slower transmission modulation is requested.

Even within bands with more stringent emission requirements, the mobile communication device 200 may be configured to select/implement the low-power circuit 218. For example, for B1 band with 5 MHz channel bandwidth, there may be relatively weaker emissions within the protected range 1884.5 MHz to 1915.7 MHz. Accordingly, the mobile communication device 200 can be configured to use the low-power circuit 218 (e.g., the first low-power transmitter 302 or the second low-power transmitter 304) can be used for narrower bandwidths.

The frequency-based application (according to e.g., the modulation profile 252 and/or the transmission profile) of the low-power circuit 218 can provide reduced power consumption for the transmission circuitry based on total transmit power, modulation order, and/or band/bandwidth. The reduced power consumption can further provide lower heat dissipation and increased battery life for the corresponding device (e.g., the terminal device 120). Moreover, the frequency-based power savings described above can provide scalability for future evolutions in the communication technologies/protocols.

Example Devices and Systems

Figure 5:
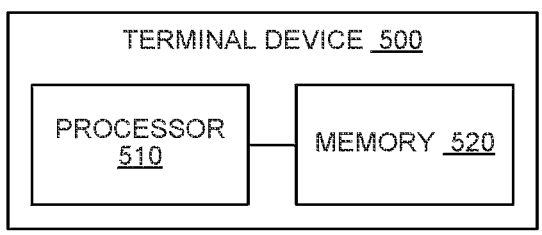
FIG. 5 is a schematic block diagram of a terminal device in accordance with one or more implementations of the present technology.
Figure 6:
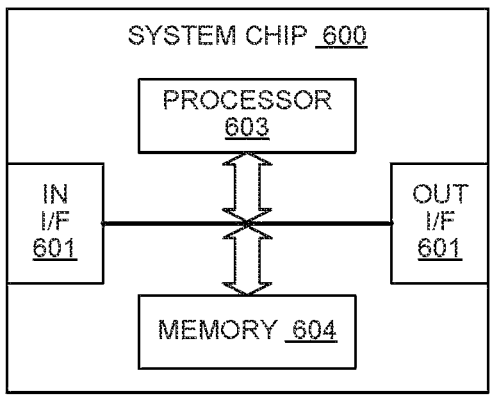
FIG. 6 is a schematic block diagram of a system chip in accordance with one or more implementations of the present technology.
Figure 7:
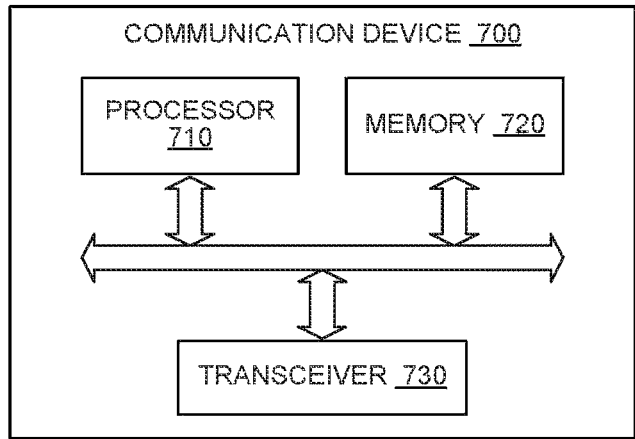
FIG. 7 is a schematic block diagram of a communications device in accordance with one or more implementations of the present technology.

FIGS. 5-7 illustrate example devices and systems that include or incorporate the variable-power transmitter and/or the corresponding control circuitry (e.g., the mobile communication device 200 of FIG. 2, the transmission circuit 300 of FIG. 3A, the transmission circuit 350 of FIG. 3B, a portion thereof, or a combination thereof).

FIG. 5 is a schematic block diagram of a terminal device 500 (e.g., an instance of the terminal device 120 of FIG. 1) in accordance with one or more implementations of the present technology. As shown in FIG. 5, the terminal device 500 includes a processing unit 510 (e.g., a DSP, a CPU, a GPU, etc., functioning as the transceiver 206 of FIG. 2, the signal processing circuitry 208 of FIG. 2, and/or one or more portions thereof) and a memory 520. The processing unit 510 can be configured to implement instructions that correspond to the method 400 of FIG. 4 and/or other aspects of the implementations described above.

FIG. 6 is a schematic block diagram of a system chip 600 (e.g., a component within the terminal device 120 of FIG. 1 and/or the network device 110 of FIG. 1) in accordance with one or more implementations of the present technology. The system chip 600 in FIG. 6 includes an input interface 601, an output interface 602, a processor 603, and a memory 604 (e.g., a non-transitory, computer-readable medium) that may be connected through an internal communication connection line, where the processor 603 is configured to execute code in the memory 604. The memory 604 can include code that corresponds to the method 400 of FIG. 4 and/or other aspects of the implementations described above. Accordingly, the processor 603 can implement the method 400 and/or other aspects of the implementations described above.

FIG. 7 is a schematic block diagram of a communications device 700 (e.g., an instance of the terminal device 120 of FIG. 1 and/or the network device 110 of FIG. 1) in accordance with one or more implementations of the present technology. The communications device 700 may include a processor 710 and a memory 720. The memory 720 may store program code, and the processor 710 may execute the program code stored in the memory 720. The memory 720 can include code that corresponds to the method 400 of FIG. 4 and/or other aspects of the implementations described above. Accordingly, the processor 710 can implement the method 600 and/or other aspects of the implementations described above.

Optionally, the communications device 700 can include a transceiver 730 (e.g., an instance of the transceiver 206 of FIG. 2, the signal processing circuitry 208 of FIG. 2, and/or one or more portions thereof). The transceiver 730 can be configured (via, e.g., hardware circuit, software code from the memory 720, and/or firmware) to implement the method 400 and/or other aspects of the implementations described above.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

EXAMPLES

Several aspects of the present technology are set forth in the following additional examples.

In one exemplary aspect, a method for operating a communications device is provided. The method includes determining a power level for transmitting a signal (e.g., a wireless signal) from the communications device; determining one or more real-time transmission conditions associated with transmitting the signal; selecting a low-power circuit for processing the signal based on the power level and the one or more real-time transmission conditions, wherein the low-power circuit is configured to process the signal using less power than a high-power circuit. Optionally, the method further includes initially processing the signal using the high-power circuit. Selecting the low-power circuit includes switching to the low-power circuit according to the power level and the one or more real-time transmission conditions.

Optionally, the one or more real-time transmission conditions includes a data rate associated with the signal; and the low-power circuit is selected when the data rate is lower than a rate threshold.

Optionally, the one or more real-time transmission conditions includes a modulation scheme used to encode data for the signal; and the low-power circuit is selected when the modulation scheme matches a scheme within a predetermined set of modulations representative of data rates below a rate threshold.

Optionally, the one or more real-time transmission conditions includes a transmission frequency band used to transmit and/or assigned for transmitting the signal; and the low-power circuit is selected when the transmission frequency band matches a band within a predetermined set of transmission bands representative of less stringent emission requirements in comparison to at least one other transmission band available for a communication standard associated with the signal.

Optionally, the communications device includes at least two or more low-power circuits in addition to the high-power circuit, the two or more low-power circuits including different component combinations designated for different communication conditions; and selecting the low-power circuit includes selecting one of the two or more low-power circuits according to the one or more real-time transmission conditions.

Optionally, one of the low-power circuits includes a lower-performance baseband filter, a lower-performance mixer, a lower-performance local oscillator (LO), a lower input voltage supply, and/or a lower-performance drive amplifier (DA) in comparison to the high-power circuit; and selecting the low-power circuit includes selecting the one of the low-power circuits when a transmission band associated with the signal matches a predetermined band representative of a relaxed out-of-band emission requirement.

Optionally, one of the low-power circuits includes a lower-performance local oscillator (LO), a lower input voltage supply, and/or a lower-performance drive amplifier (DA) in comparison to the high-power circuit; and selecting the low-power circuit includes selecting the one of the low-power circuits when a signal-to-noise ratio (SNR) targeted for the signal is lower than a predetermined threshold.

Optionally, the communications device includes a transmission path. The transmission path includes a configurable baseband filter, a modulation circuit, a higher-powered driver amplifier (DA), a lower-powered DA and a selection circuit. The configurable baseband filter is configured to generate a filtered analog signal by removing noise components from a baseband analog signal corresponding to a content targeted to be transmitted through the signal, the configurable baseband filter including selectively-activated operational amplifier (op-amp) stages. The modulation circuit includes two or more groupings that each include a mixer driven by a local oscillator (LO), wherein the two or more groupings include: a first grouping having a harmonic rejection mixer (HRM) with a corresponding LO that includes a voltage-controlled oscillator (VCO) configured to provide a signal for modulation with phase noise rating under a predetermined threshold, and a second grouping having a lower-performance mixer with a corresponding LO that includes a lower-performance oscillator and/or a lower input voltage in comparison to the first grouping. The higher-powered driver amplifier (DA) is configured to linearly amplify signals having power levels above a minimum power threshold. The lower-powered DA is configured to provide linear operations for signals having power levels less than the minimum power threshold. The selection circuit is used for selecting one of the higher-powered DA and the lower-powered DA to process the signal.

The high-power circuit corresponds to the configurable baseband filter having the selectively-activated op-amp stages in activated states, the modulation circuit with the two or more groupings in activated states, and the selection circuit configured to select the higher-powered DA instead of the lower-powered DA to process the signal. Selecting the low-power circuit includes at least one of deactivating or bypassing the selectively-activated op-amp stages; deactivating or bypassing the first grouping including the HRM; and operating the selection circuit to select the lower-powered DA instead of the higher-powered DA to process the signal.

In another exemplary aspect, a non-transitory is provided, with computer-readable medium having processor instructions stored thereon that, when executed by one or more processors, cause the one or more processors to perform a method of any one of operations mentioned above.

In yet another exemplary aspect, a communications device includes a processor configured to implement a method of any one of operations mentioned above, and an output circuit (e.g., an antenna group or a port) coupled to the processor and configured to transmit the signal.

In yet another exemplary aspect, a communications device includes a signal processing circuitry, a transmission path and a selection circuit. The signal processing circuitry is configured to determine a power level for transmitting a signal from the communications device, and determining one or more real-time transmission conditions associated with transmitting the signal. The transmission path is configured to process the signal for transmission, wherein the transmission path includes a high-power circuit configured to process the signal, and a low-power circuit configured to process the signal with lower power consumption than the high-power circuit. The selection circuit is configured to select between the high-power circuit and the low-power circuit according to the power level and the one or more real-time transmission conditions.

Optionally, selection circuit is configured to select the high-power circuit (1) when the power level meets or exceeds a power threshold and/or (2) when the one or more real-time transmission conditions includes an associated data rate that meets or exceeds a rate threshold.

Optionally, selection circuit is configured to select the low-power circuit or a portion thereof (1) when the signal corresponds to the power level below a power threshold, (2) when an associated data rate is below a rate threshold, and/or (3) when a transmission frequency for the signal matches a predetermined band representative of relaxed emission requirements in comparison to other available bands.

Optionally, the high-power circuit is configured to generate the signal with higher signal fidelity than (corresponding signals to, e.g., higher likelihood of accurate detection/ decoding, tighter tolerances for signal/symbol parameters, such as for signal amplitudes and/or phases, and/or lower out-of-band signal components in comparison to signals from) the low-power circuit and includes at least one of: an analog baseband filter, a harmonic rejection mixer (HRM), and a driver amplifier (DA). The analog baseband filter is configured to remove noise components from the signal. The harmonic rejection mixer (HRM) includes a local oscillator (LO), wherein the HRM is configured to modulate a signal to a transmission frequency in processing the signal, and the LO includes a voltage-controlled oscillator (VCO) configured facilitate the modulation with phase noise below a predetermined threshold. The driver amplifier (DA) is configured to linearly amplify signals having power levels above a minimum power threshold.

Optionally, the analog baseband filter in the high-power circuit includes a set of operational amplifiers (op-amps); and the low-power circuit includes a lower-performance baseband filter including a number of active op-amps less than the set of op-amps in the analog baseband filter of the high-power circuit.

Optionally, the low-power circuit includes a lower-performance mixer having less capacity to reduce harmonic frequency or other out-of-band noise in comparison to the HRM.

Optionally, the lower-performance mixer is (1) configured to use a supply voltage lower than the HRM and/or (2) includes a VCO that utilizes less power than the VCO in the HRM.

Optionally, the low-power circuit includes a lower-power DA configured to provide linear operations for signals having power levels less than the minimum power threshold.

Optionally, the transmission path includes a configurable baseband filter, a modulation circuit, a higher-powered driver amplifier (DA), a lower-powered DA and the selection circuit. The configurable baseband filter is configured to generate a filtered analog signal by removing noise components from a baseband analog signal corresponding to a content targeted to be transmitted through the signal, the configurable baseband filter including selectively-activated operational amplifier (op-amp) stages. The modulation circuit includes a harmonic rejection mixer (HRM); a high-performance LO that includes a voltage-controlled oscillator (VCO) configured to provide a signal for modulation with phase noise rating under a predetermined threshold; a lower-performance mixer having greater out-of-band noise tolerances than the HRM, and a lower-performance LO that includes (1) a lower-performance oscillator with noise rating over the predetermined threshold and/or (2) a lower input voltage in comparison to the high-performance LO. The higher-powered driver amplifier (DA) is configured to linearly amplify signals having power levels above a minimum power threshold. The lower-powered DA is configured to provide linear operations for signals having power levels less than the minimum power threshold. The selection circuit is further configured to select one of the higher-powered DA and the lower-powered DA to process the signal.

The high-power circuit corresponds to the configurable baseband filter having the selectively-activated op-amp stages in activated states, the modulation circuit with the HRM, the high-performance LO, the lower performance mixer, and the lower-performance LO in activated states, and the selection circuit configured to select the higher-powered DA instead of the lower-powered DA to process the signal.

The low-power circuit is selected based on at least one of deactivating or bypassing the selectively-activated op-amp stages; deactivating or bypassing the HRM and/or the high-performance LO; operating the selection circuit to select the lower-powered DA instead of the higher-powered DA to process the signal.

The low-power circuit includes at least (1) a first low-power circuit combination for use at least according to a transmission frequency (e.g., when the transmission frequency matches a predetermined frequency associated with lower emission requirements) and (2) a second low-power circuit combination for use according to the power level (e.g., lower power than a power threshold) and/or an associated data rate (e.g., a lower rate than a rate threshold and/or based on using a modulation scheme associated with the lower rate).

Optionally, the low-power circuit includes a first low-power circuit combination and a second low-power circuit combination. The first low-power circuit combination is configured based on deactivating or bypassing the selectively-activated op-amp stages, deactivating or bypassing the HRM and the high-performance LO in the modulation circuit, and operating the selection circuit to select the lower-powered DA instead of the higher-powered DA to process the signal. The second low-power circuit combination is configured based on deactivating or bypassing the high-performance LO in the modulation circuit, and operating the selection circuit to select the lower-powered DA instead of the higher-powered DA to process the signal.

The selection circuit is configured to select the first low-power circuit combination according to a transmission frequency; and the second low-power circuit combination according to the power level and/or an associated data rate.

Optionally, the circuitry is configured to process the signal according to at least one of a Fourth Generation (4G) cellular standard, a Fifth Generation (5G) cellular standard, an Institute of Electrical and Electronics Engineers (IEEE) standard 802.11, a new radio protocol.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a communications device, the method comprising:

determining a power level for transmitting a wireless signal from the communications device;

determining one or more real-time transmission conditions associated with transmitting the wireless signal; and selecting a low-power circuit for processing the wireless signal based on the power level and the one or more real-time transmission conditions;

wherein the low-power circuit is configured to process the wireless signal using less power than a high-power circuit;

the one or more real-time transmission conditions includes a data rate associated with the wireless signal;

the method further comprises determining that the data rate is lower than a rate threshold; and the low-power circuit is selected based on the data rate being determined to be lower than the rate threshold.

2. The method of claim 1, further comprising:

initially processing the wireless signal using the high-power circuit; and wherein:

selecting the low-power circuit includes switching to the low-power circuit according to the power level and the one or more real-time transmission conditions.

3. The method of claim 1, wherein:

the one or more real-time transmission conditions includes a modulation scheme used to encode data for the wireless signal;

the method further comprises determining that the modulation scheme matches a scheme within a predetermined set of modulations representative of data rates below a rate threshold; and the low-power circuit is selected based on the modulation scheme matches-a being determined to match the scheme within the predetermined set of modulations representative of data rates below the rate threshold.

4. The method of claim 1, wherein:

the one or more real-time transmission conditions includes a transmission frequency band used to transmit the wireless signal;

the method further comprises determining the transmission frequency band matches a band within a predetermined set of transmission bands representative of less stringent emission requirements in comparison to at least one other transmission band available for a communication standard associated with the wireless signal; and the low-power circuit is selected based on the transmission frequency band being determined to match the band within the predetermined set of transmission bands representative of less stringent emission requirements in comparison to the at least one other transmission band available for the communication standard associated with the wireless signal.

5. The method of claim 1, wherein:

the communications device includes at least two or more low-power circuits in addition to the high-power circuit, the two or more low-power circuits including different component combinations designated for different communication conditions; and selecting the low-power circuit includes selecting one of the two or more low-power circuits according to the one or more real-time transmission conditions.

6. The method of claim 5, wherein:

one of the low-power circuits includes at least one of: a lower-performance baseband filter in comparison to the higher-power circuit, a lower-performance mixer in comparison to the high-power circuit, a lower-performance local oscillator (LO) in comparison to the high-power circuit, a lower input voltage supply in comparison to the high-power circuit, or a lower-performance drive amplifier (DA) in comparison to the high-power circuit;

the method further comprises determining that a transmission band associated with the wireless signal matches a predetermined band representative of a relaxed out-of-band emission requirement; and selecting the low-power circuit includes selecting the one of the low-power circuits based on the transmission band associated with the wireless signal being determined to match the predetermined band representative of the relaxed out-of-band emission requirement.

7. The method of claim 5, wherein:

one of the low-power circuits includes at least one of: a lower-performance local oscillator (LO) in comparison to the high-power circuit, a lower input voltage supply in comparison to the high-power circuit, or a lower-performance drive amplifier (DA) in comparison to the high-power circuit;

the method further comprises determining that a signal-to-noise ratio (SNR) targeted for the wireless signal is lower than a predetermined threshold; and selecting the low-power circuit includes selecting the one of the low-power circuits based on the SNR targeted for the wireless signal being determined to be lower than the predetermined threshold.

8. The method of claim 1, wherein:
the communications device includes a transmission path including:
a configurable baseband filter configured to generate a filtered analog signal by removing noise components from a baseband analog signal corresponding to a content targeted to be transmitted through the wireless signal, the configurable baseband filter including selectively-activated operational amplifier (op-amp) stages,
a modulation circuit including two or more groupings that each include a mixer driven by a local oscillator (LO), wherein the two or more groupings include:
a first grouping having a harmonic rejection mixer (HRM) with a corresponding LO that includes a voltage-controlled oscillator (VCO) configured to provide a signal for modulation with phase noise rating under a predetermined threshold, and
a second grouping having a lower-performance mixer with a corresponding LO that includes at least one of: a lower-performance oscillator in comparison to the first grouping and/or a lower input voltage in comparison to the first grouping,
a higher-powered driver amplifier (DA) configured to linearly amplify signals having power levels above a minimum power threshold,
a lower-powered DA configured to provide linear operations for signals having power levels less than the minimum power threshold, and
a selection circuit for selecting one of the higher-powered DA and the lower-powered DA to process the wireless signal;
the high-power circuit corresponds to:
the configurable baseband filter having the selectively-activated op-amp stages in activated states,
the modulation circuit with the two or more groupings in activated states, and
the selection circuit configured to select the higher-powered DA instead of the lower-powered DA to process the wireless signal; and
selecting the low-power circuit includes at least one of:
deactivating or bypassing the selectively-activated op-amp stages,
deactivating or bypassing the first grouping including the HRM, or
operating the selection circuit to select the lower-powered DA instead of the higher-powered DA to process the wireless signal.

9. A non-transitory, computer-readable medium having processor instructions stored thereon that, when executed by one or more processors, cause the one or more processors to perform actions comprising:
determining a power level for transmitting a wireless signal from the communications device;
determining one or more real-time transmission conditions associated with transmitting the wireless signal; and
selecting a low-power circuit for processing the wireless signal based on the power level and the one or more real-time transmission conditions;
wherein the low-power circuit is configured to process the wireless signal using less power than a high-power circuit;
the one or more real-time transmission conditions includes a data rate associated with the wireless signal;

the actions further comprise de ter ng that the data rate is lower ha a rate threshold; and
the low-power circuit is selected based on the data rate being determined to be lower than the rate threshold.

10. A communications device comprising:
a signal processing circuitry configured to:
determine a power level for transmitting a wireless signal from the communications device, and
determine one or more real-time transmission conditions associated with transmitting the wireless signal;
a transmission path configured to process the wireless signal for transmission, wherein the transmission path includes:
a high-power circuit configured to process the wireless signal, and
a low-power circuit configured to process the wireless signal with lower power consumption than the high-power circuit; and
a selection circuit configured to select between the high-power circuit and the low-power circuit according to the power level and the one or more real-time transmission conditions;
wherein the one or more real-time transmission conditions includes a data rate associated with the wireless signal;
the signal processing circuitry is further configured to determine that the data rate is lower than a rate threshold; and
the selection circuit is configured to select the low power circuit based on the data rate being determined to be lower than the rate threshold.

11. The communications device of claim 10, wherein at least one of:
the signal processing circuitry is configured to determine that the power level meets or exceeds a power threshold, and the selection circuit is configured to select the high-power circuit based on the power level being determined to meet or exceed the power threshold, or
the selection circuit is configured to select the high-power circuit based on the data rate being determined to meet or exceed the rate threshold.

12. The communications device of claim 10, wherein least one of:
the signal processing circuitry is configured to determine that the wireless signal corresponds to the power level below a power threshold, and the selection circuit is configured to select the low-power circuit or a portion thereof based on the wireless signal being determined to correspond to the power level below a power threshold, or
the signal processing circuitry is configured to determine that a transmission frequency for the wireless signal matches a predetermined band representative of relaxed emission requirements in parison to other available bands, and the selection circuit is configured to select the low-power circuit or a portion thereof based on the transmission frequency for the wireless signal being determined to match the predetermined band representative of the relaxed emission requirements in comparison to the other available bands.

13. The communications device of claim 10, wherein the high-power circuit is configured to generate the wireless signal with higher signal fidelity than the low-power circuit and includes at least one of:
an analog baseband filter configured to remove noise components from the wireless signal;

a harmonic rejection mixer (HRM) including a local oscillator (LO), wherein:

the HRM is configured to modulate a signal to a transmission frequency in processing the wireless signal, and the LO includes a voltage-controlled oscillator (VCO) configured facilitate the modulation with phase noise below a predetermined threshold; and/or a driver amplifier (DA) configured to linearly amplify signals having power levels above a minimum power threshold.

14. The communications device of claim 13, wherein:

the high-power circuit includes at least the analog baseband filter, and the analog baseband filter includes a set of operational amplifiers (op-amps); and the low-power circuit includes a lower-performance baseband filter including a number of active op-amps less than the set of op-amps in the analog baseband filter of the high-power circuit.

15. The communications device of claim 13, wherein the high-power circuit includes at least the HRM, and the low-power circuit includes a lower-performance mixer having less capacity to reduce harmonic frequency or other out-of-band noise in comparison to the HRM.

16. The communications device of claim 15, wherein the lower-performance mixer at least one of:

is configured to use a supply voltage lower than the HRM, or includes a VCO that utilizes less power than the VCO in the HRM.

17. The communications device of claim 13, wherein the high-power circuit includes at least the DA, and the low-power circuit includes a lower-power DA configured to provide linear operations for signals having power levels less than the minimum power threshold.

18. The communications device of claim 10, wherein:

the transmission path includes:

a configurable baseband filter configured to generate a filtered analog signal by removing noise components from a baseband analog signal corresponding to a content targeted to be transmitted through the wireless signal, the configurable baseband filter including selectively-activated operational amplifier (op-amp) stages, a modulation circuit including:

a harmonic rejection mixer (HRM), a high-performance LO that includes a voltage-controlled oscillator (VCO) configured to provide a signal for modulation with phase noise rating under a predetermined threshold, a lower-performance mixer having greater out-of-band noise tolerances than the HRM, and a lower-performance LO that includes at least one of:

a lower-performance oscillator with noise rating over the predetermined threshold or a lower input voltage in comparison to the high-performance LO, a higher-powered driver amplifier (DA) configured to linearly amplify signals having power levels above a minimum power threshold, a lower-powered DA configured to provide linear operations for signals having power levels less than the minimum power threshold, and the selection circuit further configured to select one of the higher-powered DA and the lower-powered DA to process the wireless signal;

the high-power circuit corresponds to:

the configurable baseband filter having the selectively-activated op-amp stages in activated states, the modulation circuit with the HRM, the high-performance LO, the lower performance mixer, and the lower-performance LO in activated states, and the selection circuit configured to select the higher-powered DA instead of the lower-powered DA to process the wireless signal;

the low-power circuit is selected based on at least one of:

deactivating or bypassing the selectively-activated op-amp stages, deactivating or bypassing at least one of: the HRM and/or the high-performance LO, or operating the selection circuit to select the lower-powered DA instead of the higher-powered DA to process the wireless signal; and the low-power circuit includes at least one of: a first low-power circuit combination for use according to a transmission frequency, or a second low-power circuit combination for use according to at least one of: the power level and/or an associated data rate.

19. The communications device of claim 18, wherein:

the low-power circuit includes:

a first low-power circuit combination configured based on at least one of:

deactivating or bypassing the selectively-activated op-amp stages, deactivating or bypassing the HRM and the high-performance LO in the modulation circuit, or operating the selection circuit to select the lower-powered DA instead of the higher-powered DA to process the wireless signal, a second low-power circuit combination configured based on at least one of:

deactivating or bypassing the high-performance LO in the modulation circuit, or operating the selection circuit to select the lower-powered DA instead of the higher-powered DA to process the wireless signal; and the selection circuit is configured to select:

the first low-power circuit combination according to a transmission frequency and the second low-power circuit combination according to at least one of: the power level and/or an associated data rate.

20. The non-transitory, computer-readable medium of claim 9, wherein:

the communications device includes a transmission path including:

a configurable baseband filter configured to generate a filtered analog signal by removing noise components from a baseband analog signal corresponding to a content targeted to be transmitted through the wireless signal, the configurable baseband filter including selectively-activated operational amplifier (op-amp) stages, a modulation circuit including two or more groupings that each include a mixer driven by a local oscillator (LO), wherein the two or more groupings include:

a first grouping having a harmonic rejection mixer (HRM) with a corresponding LO that includes a voltage-controlled oscillator (VCO) configured to provide a signal for modulation with phase noise rating under a predetermined threshold, and a second grouping having a lower-performance mixer with a corresponding LO that includes at least one of: a lower-performance oscillator in comparison to the first grouping or a lower input voltage in comparison to the first grouping, a higher-powered driver amplifier (DA) configured to linearly amplify signals having power levels above a minimum power threshold, a lower-powered DA configured to provide linear operations for signals having power levels less than the minimum power threshold, and a selection circuit for selecting one of the higher-powered DA and the lower-powered DA to process the wireless signal;

the high-power circuit corresponds to:

the configurable baseband filter having the selectively-activated op-amp stages in activated states, the modulation circuit with the two or more groupings in activated states, and the selection circuit configured to select the higher-powered DA instead of the lower-powered DA to process the wireless signal; and selecting the low-power circuit includes at least one of:

deactivating or bypassing the selectively-activated op-amp stages, deactivating or bypassing the first grouping including the HRM, or operating the selection circuit to select the lower-powered DA instead of the higher-powered DA to process the wireless signal.

* * * * *